United States Patent
Lu et al.

(10) Patent No.: US 12,015,561 B2
(45) Date of Patent: Jun. 18, 2024

(54) METHODS AND SYSTEMS TO DYNAMICALLY PRIORITIZE APPLICATIONS OVER 802.11 WIRELESS LAN

(71) Applicant: HEWLETT PACKARD ENTERPRISE DEVELOPMENT LP, Houston, TX (US)

(72) Inventors: Hao Lu, Santa Clara, CA (US); Sachin Ganu, Santa Clara, CA (US); Nitin A. Changlani, Santa Clara, CA (US); Xiaoding Shang, Beijing (CN); Qiang Zhou, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 148 days.

(21) Appl. No.: 17/129,089

(22) Filed: Dec. 21, 2020

(65) Prior Publication Data

US 2022/0200924 A1    Jun. 23, 2022

(51) Int. Cl.
*H04L 47/62* (2022.01)
*H04B 7/0413* (2017.01)
(Continued)

(52) U.S. Cl.
CPC ....... *H04L 47/6215* (2013.01); *H04B 7/0413* (2013.01); *H04L 5/0007* (2013.01); *H04L 47/2433* (2013.01)

(58) Field of Classification Search
CPC ............... H04L 47/6215; H04L 5/0007; H04L 47/2433; H04L 47/2441; H04L 47/50;
(Continued)

(56) References Cited

U.S. PATENT DOCUMENTS 9,590,916 B2    3/2017   Ashokan et al.
2002/0144147 A1* 10/2002  Basson ............... H04L 41/0893
                                                    726/14
(Continued)

FOREIGN PATENT DOCUMENTS

EP          2985963 A1 *  2/2016  ............. H04L 47/11
WO     WO-9934544 A1 *  7/1999  ........... H04L 1/1854
(Continued)

OTHER PUBLICATIONS

An efficient buffer control and packet scheduling for the access point of IP networks and ATM network Chang-Wook Kim;Jung-Ahn Han;Hwan-Gyu Lee;Woo-Zoo Kim;Byung-Gi Kim;Moon-Ho Lee;Joo-Myoung Seok;Jong-Hyub Lee Eighth International Conference on Parallel and Distributed Systems. ICPADS 2001 (Year: 2001).*

(Continued)

*Primary Examiner* — Jeffrey R Swearingen
(74) *Attorney, Agent, or Firm* — Sheppard Mullin Richter & Hampton LLP

(57) ABSTRACT

Systems and techniques are described that are directed to intelligent scheduling of Wi-Fi services for applications, including enhanced dynamic prioritization. A device, such as an access point (AP), can receive data packets from multiple connected devices to dynamically identify an application flow for each data packet, and dynamically identify a user associated with the application flow for each data packet. The AP can generate prioritized candidate lists for selected data packets in queues corresponding to an access category (AC). In response to determining that the identified user associated with the application flow corresponds with a critical user, the AP can select data packets for the prioritized candidate lists based at least in part on priority policies for each of a plurality of applications and based at least in part on dynamic prioritization of applications for each of a (Continued)

plurality of applications; and schedule data packets from the prioritized candidate lists.

20 Claims, 9 Drawing Sheets

(51) Int. Cl.
*H04L 5/00* (2006.01)
*H04L 47/2425* (2022.01)

(58) Field of Classification Search
CPC ... H04L 47/564; H04L 47/2416; H04L 47/24; H04L 47/6275; H04B 7/0413
USPC .......................................................... 709/203
See application file for complete search history.

(56) References Cited

U.S. PATENT DOCUMENTS

| | | | |
|---|---|---|---|
| 2005/0152373 A1* | 7/2005 | Ali | H04L 47/808 370/310 |
| 2005/0215284 A1 | 9/2005 | Su et al. | |
| 2014/0161121 A1* | 6/2014 | Yin | H04M 1/2535 370/352 |
| 2014/0379937 A1* | 12/2014 | Hughes | H04L 45/00 709/240 |
| 2016/0044516 A1* | 2/2016 | Hedayat | H04L 47/52 370/329 |
| 2017/0373789 A1* | 12/2017 | Huang | H04B 7/0452 |
| 2019/0041976 A1* | 2/2019 | Veeramani | G06F 3/011 |
| 2019/0190848 A1* | 6/2019 | Zavesky | H04L 47/821 |
| 2021/0185738 A1* | 6/2021 | John | H04L 5/0048 |
| 2021/0385878 A1* | 12/2021 | del Carpio Vega | H04W 74/0841 |

FOREIGN PATENT DOCUMENTS

| | | | | |
|---|---|---|---|---|
| WO | WO-2005069876 A2 * | 8/2005 | ............. | H04L 47/10 |
| WO | WO-2016010526 A1 * | 1/2016 | ........ | H04W 28/0205 |
| WO | WO-2017147411 A1 * | 8/2017 | ............. | G06F 15/16 |

OTHER PUBLICATIONS

Enhancing 802.11ac Dynamic Access method for Increasing the Throughput of Low Priority Access Categories BK and BE Souhila Mammeri;Mohand Yazid;Louiza Bouallouche-Medjkoune; 2018 International Symposium on Networks, Computers and Communications (ISNCC) Year: 2018 | Conference Paper | Publisher: IEEE (Year: 2018).*

Voice capacity analysis of WLANS with channel access prioritizing mechanisms Xinhua Ling; Yu Cheng; Xuemin Shen; Jon W. Mark IEEE Communications Magazine Year: 2008 | vol. 46, Issue: 1 | Magazine Article | Publisher: IEEE (Year: 2008).*

A hardware acceleration unit for MPI queue processing K.D. Underwood • K.S. Hemmert • A. Rodrigues • R. Murphy • R. Brightwell Publication Date: Jan. 1, 2005 Published in: 19th IEEE International Parallel and Distributed Processing Symposium (p. 10 pp.) (Year: 2005).*

Arubaos Enhanced network operating system for today's digital workplace, https://www.arubanetworks.com/assets/ds/DS_ArubaOS. pdf Retrieved Sep. 8, 2020, 20 pgs., Hewlett Packard Enterprise Development LP.

Iera, A., et al., Providing Throughput Guarantees in 802.11e WLAN Through a Dynamic Priority Assignment Mechanism, Wireless Personal Communications, 2005, pp. 109-125, vol. 34, https://link.springer.com/article/10.1007/s11277-005-8729-7 Retrieved Sep. 8, 2020, Springer.

Iera, A., et al., An Algorithm for Dynamic Priority Assignment in 802.11e WLAN MAC Protocols, ICT 2004: Telecommunications and Networking—ICT 2004, https://link.springer.com/chapter/10.1007/978-3-540-27824-5_164 Retrieved Sep. 8, 2020, 2004, 2 pgs., Springer-Verlag, Berlin Heidelberg.

* cited by examiner

METHODS AND SYSTEMS TO DYNAMICALLY PRIORITIZE APPLICATIONS OVER 802.11 WIRELESS LAN

DESCRIPTION OF RELATED ART

The Wi-Fi transmission may utilize multiple different transmission protocols, which may include both OFDMA (Orthogonal Frequency-Division Multiple Access), which may be used to support low latency operations, and MU-MIMO (Multi-User Multiple-Input and Multiple-Output), which may be used to support high data throughput operations.

The IEEE 802.11ax standard, also referred to as Wi-Fi 6, provides support for both OFDMA and MU-MIMO modes of operation in uplink and downlink. These alternative modes allow for flexibility in supporting varying operations as both applications requiring low latency and operations requiring high data throughput will be supported by a particular access point (AP) that is operating under IEEE 802.11ax.

However, these modes of operation must be applied effectively in order to receive the full benefits of the technology. For example, in a system that is supporting multiple different applications for multiple clients, the latency and data requirements of each application may vary greatly. Further, there may be certain applications that should be prioritized in a particular environment.

Thus, there are multiple different factors to be balanced in scheduling under IEEE 802.11ax, creating complications and overhead costs for system operators in making scheduling decisions.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
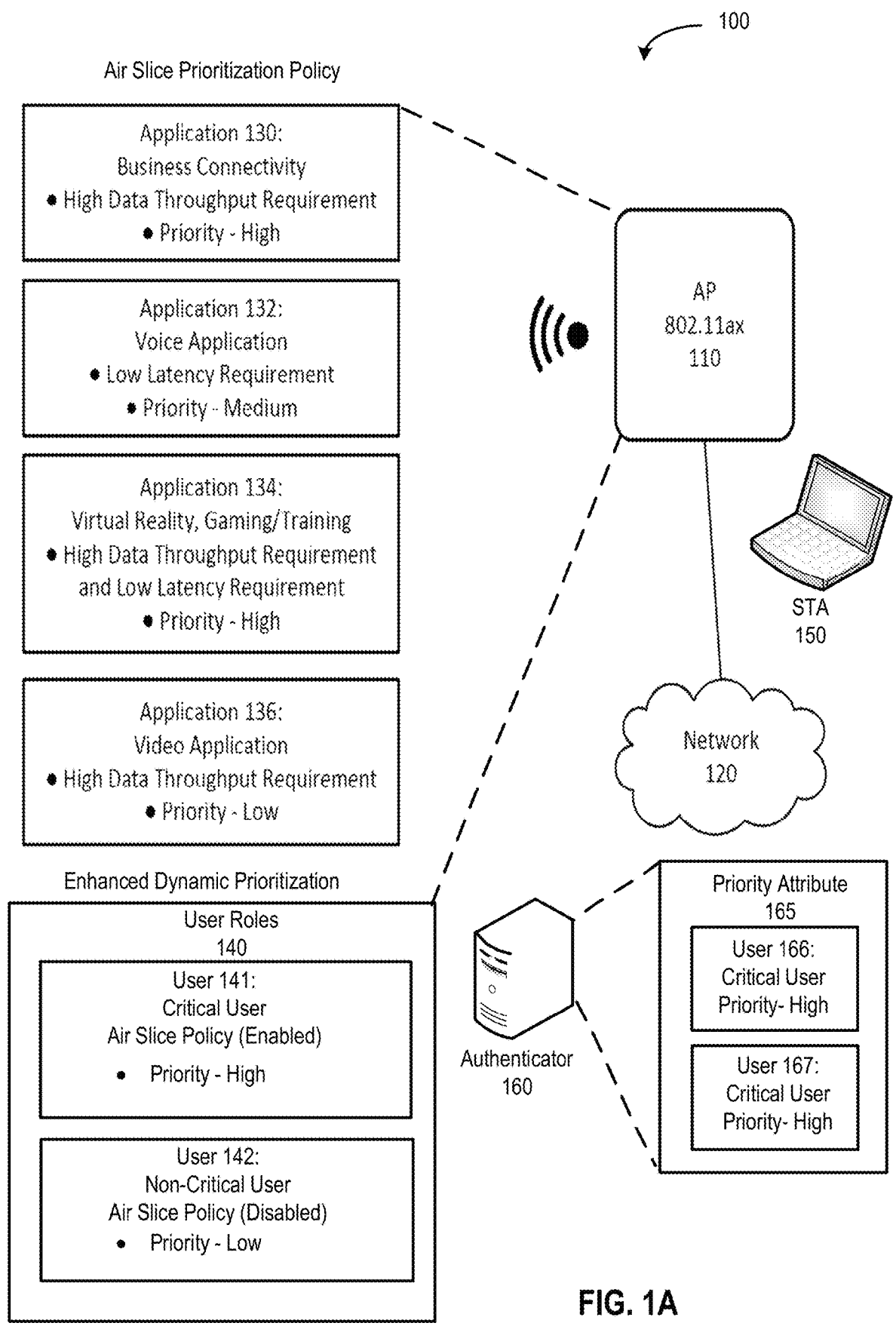
FIG. 1A illustrates an intelligent scheduling, including enhanced dynamic prioritization of applications for Wi-Fi services, according to some embodiments.

The figures are not exhaustive and do not limit the present disclosure to the precise form disclosed.

DETAILED DESCRIPTION

The IEEE 802.11 family of standards for wireless local area network (WLAN) technology, also referred to as Wi-Fi, typically include Quality of Service (QoS) extensions that can manage prioritization based on the type of data. For example, QoS extensions for some 802.11 protocols may prioritize the transmission of voice packets and video packets. Particularly, Wi-Fi Multimedia (WMM), previously known as Wireless Multimedia Extensions (WME), is a subset of the 802.11e wireless LAN (WLAN) specification that enhances QoS on a network by prioritizing packets according to four access categories (AC). According to WMM, the access categories (arranged from highest priority to lowest) include:
1) Voice: By giving voice packets the highest priority, WMM enables concurrent Voice over IP (VoIP) calls with minimal latency and the highest quality possible;
2) Video: By placing video packets in the second tier, WMM prioritizes it over all other data traffic and enables support for three to four standard definition TV (SDTV) streams or one high definition TV (HDTV) stream on a WLAN;
3) Best effort: Best effort data packets consist of those originating from legacy devices or from applications or devices that lack QoS standards; and
4) Background: Background priority encompasses file downloads, print jobs and other traffic that does not suffer from increased latency.

Devices and access points on a WLAN must be certified by the Wi-Fi Alliance to take advantage of WMM's QoS features. Source applications must also support WMM. Each of the aforementioned WMM access categories represents a different WLAN transmit and/or receive (Tx/Rx) policy. WMM also defines how the IP Differentiated Services Code Point (DSCP) values could be mapped into those access categories. For example, when traffic flows coming from wired network to a wireless client, the WMM can maps IP DSCP to certain access categories so that packets which contain different IP DSCP values, are routed to different transmission queues. Thus, the packets, being in the different transmission queues, are transmitted in accordance with different WLAN transmission policies.

However, WMM and other conventional transmission schemes for Wi-Fi 6 must be applied optimally in order to maximize the benefits for traffic to move efficiently in the wireless network. For example, Wi-Fi services need to be scheduled appropriately to meet any guaranteed service level agreements (SLAB) used for critical applications. In most cases, different applications will require different treatment in terms of allocating the wireless resources that are available from an access point. For instance, a voice application may have low jitter tolerance, (e.g., less than 20 ms), while a video streaming application may generally have higher bandwidth requirements. Even further, applications that are being for newer technology, such as virtual reality (VR) (e.g., used in gaming, training, and other operations)

may require both high bandwidth and low latency guarantees in order to provide acceptable user experience.

In addition to the SLA/QoS requirements associated with the applications, a priority that is related to how the applications are used in a particular environment can be a consideration in optimizing scheduling. For instance, different deployments in a network may have a different set of preferred applications (high priority applications) depending on an importance of using those applications in the particular networking environment. In other words, some applications may be used more frequently, or have a use that is considered more critical in a networking environment, than other applications. As an example, in an office network environment, it may be desirable for an Information Technology (IT) administrator to give preferential treatment for business enterprise applications (e.g., office tool applications, video conferencing applications, sales support applications, and file storage applications) over applications that are considered less critical to operations of the business (e.g., social media applications). In contrast, a different networking environment (i.e., different from an office networking environment) may correspondingly have different types of applications that are considered preferred, or high priority applications, due to their specific use in that network. For instance, in a university networking environment, gaming applications and media streaming applications may be dominant (e.g., used more frequently), and therefore may require higher priority. Furthermore, some networking environments may include the use of special-purpose applications that may not have common wide-spread use (e.g., rarely used outside of that industry), but have uses that are deemed critical to operations in that environment, and therefore need to be prioritized in that particular network. As an example, a hospital networking environment may require the prioritization of such special-purpose applications as Electronic Health Records (EHR) applications, electronic prescription software, and various imaging and visualization applications.

Accordingly, the disclosed intelligent scheduling of applications optimizes the management of traffic over wireless networking technology (e.g., Wi-Fi), for instance enhancing SLA/QoS. The intelligent scheduling of applications are described as an aspect of "Air Slice" technology, and includes the disclosed enhanced dynamic prioritization techniques. As referred to herein, Air Slice is a wireless (RF) technology that is designed to optimize user and application experience by providing SLA-grade application assurance. Generally, Air Slice technology can operate to allocate a virtual "slice" of Wi-Fi spectral resources, based on policies per device, per user, or per user role, to support each client through use of a combination of multiple sets of dedicated queues and 802.11ax MAC scheduling enhancements. By dynamically allocating radio resources, such as time, frequency, and spatial streams, a guarantee performance for latency-sensitive applications (e.g., AR/VR, Zoom™, Slack™) can be implemented which may increase throughput for high-bandwidth applications, and can provide an optimized experience for wireless devices. These scheduling enhancements are especially useful when other types of traffic, that may be deemed as non-critical services, are also in use (e.g., basic Internet access, messaging, and other applications). A Policy Enforcement Firewall (PEF) can play a key role in this intelligent scheduling, by providing application intelligence, as well as associated user roles and device types. Specifically, the disclosed enhanced dynamic prioritization aspects of the intelligent scheduling can dynamically assign airtime prioritization (Air Slice policy) that is based on client properties and user properties. According to some embodiments, enhanced dynamic prioritization can involve dynamically assigning airtime for each application individually by: 1) leveraging vendor-specific attributes (VSA) for Remote Authentication Dial-In User Service (RADIUS) that specify scheduling priority; 2) leveraging role assignments in a manner that specifies priority; 3) leveraging a combination thereof.

The aforementioned improvements to managing network traffic may be further enhanced by employing the disclosed intelligent scheduling techniques in a 802.11 wireless LAN that is using one of the newer standards of Wi-Fi technology, such as Wi-Fi 6. For example, a wireless network that is employing Wi-Fi 6 and equipped with Air Slice (including intelligent scheduling and guaranteed service levels) may be able to leverage the enhanced features of the newer Wi-Fi standard to achieve even faster speeds, lower latency, and greater efficiency. These enhanced capabilities for the Wi-Fi network can become especially useful in networking environments with a higher density of bandwidth-hungry devices (e.g., crowded areas, stadiums, lecture halls, large public venues, and the like). Also, consistency in the wireless experience has been a multi-pronged challenge, where wireless networks may experience multiple issues such as inconsistent bitrate, latency, and jitter for every application. Often, these inconsistencies may occur despite existing QoS policies that can prioritize certain applications. However the disclosed intelligent scheduling techniques can provide improvements over the Airtime Fairness capabilities of traditional Wi-Fi standards. Furthermore, Air Slice can employ the disclosed intelligent scheduling techniques in a manner that minimizes airtime contention and efficiently groups Wi-Fi 6 and non-Wi-Fi 6 client devices to guarantee bit rate, and provide bounded latency and jitter simultaneously. Specifically, the enhanced dynamic prioritization can prioritize applications based on client properties and user properties to ensure a guaranteed experience for mission-critical applications.

In some embodiments, Air Slice technology includes intelligent scheduling that assigns a priority to a particular application based on client properties and user properties. As a general description, through Air Slice an access point (AP) can be configured to identify a client (e.g., device) and identify a user such that an application priority can be assigned within user role (based on the identified user), or the application priority can be assigned using an attribute within an authenticator, such as a RADIUS server. Given the diversity of users and devices in many enterprise networks, it can be important to characterize those users and devices with respect to the application's importance (e.g., criticalness) in the networking environment and further the priority for the application in the network's scheduling scheme. For example, referring again to an office network environment, actual employees of the business or corporation may be characterized as critical. Accordingly, prioritizing the traffic associated with these critical users (employees) on the network can optimize the network's scheduling scheme to be better adapted for that specific networking environment. Conversely, users that are temporarily visiting the business, may be characterized as non-critical users. Thus, it may be optimal to assign the traffic associated with these non-critical users with a lower priority in the network's scheduling scheme. If both non-critical users and critical users are utilizing critical applications at the same time, where critical applications benefit from high prioritization in the scheduling scheme (airtime preferentially used by critical applications for Air Slice), then all of the traffic from these users in the network will be deemed high priority. This scenario where all of the traffic is treated as high priority (e.g., there is no differentiation between the traffic from non-critical users and the traffic from critical users), has a high potential of exhausting the resources of the wireless network.

In some embodiments, Air Slice technology allows for optimizing selection between transmission modes for each of multiple applications for client operations, while supporting application priorities. Further, Air Slice allows for greater granularity in allocation of resources than conventional tools, allowing for related types of applications to be treated differently in certain circumstances. In one example, two different voice applications may be assigned different priorities if, for instance, a first voice application is a preferred enterprise application for an environment while the second application is a general voice application that has not been allocated the same level of importance in the environment.

The Air Slice technology allows for greater granularity conventional Wi-Fi scheduling schemes (including 802.11ax scheduling) by implementing the enhanced dynamic prioritization techniques. The disclosed prioritization is considered "enhanced" by employing mechanisms for selecting one or more priority applications, and further allowing adapting the priority applications for a particular user or device. This priority selection can be integrated into the dynamic classification, prioritization, and scheduling decisions within the APs operating in accordance with Air Slice. The technology provides means for maintaining QoS metrics for each client to provide acceptable user experience, while prioritizing applications as appropriate for an environment.

In some embodiments, the Air Slice technology utilizes multiple constructs that are made available by 802.11ax, the constructs including OFDMA, MU-MIMO, and TWT, with the ability to support multiple different types of services. The services may include gaming, voice/video, IoT (Internet of Things) workflows, and in general applications requiring low latency, high bandwidth, or both, with varying priorities.

In the selection of services, OFDMA increases overall efficiency by serving multiple client devices simultaneously using narrower channel bandwidth and also amortizing the preamble overhead among users, and is preferred for low-bandwidth applications that are delay/jitter sensitive. On the other hand, MU-MIMO increases the overall capacity by providing higher speeds per user, and is preferred for high-bandwidth applications that are less delay or jitter sensitive. In some embodiments, Air Slice technology is applied intelligently select the scheduling mechanism between OFDMA and MU-MIMO based on the type of application that is being served, while applying any applicable application priorities. In some embodiments, the technology may further provide for SU-MIMO (Single User MIMO) when such operation would provide the best performance, such as when high bandwidth is required but MU-MIMO isn't available or practical for any reason.

In some embodiments, intelligent scheduling of Wi-Fi resources may be supported for all clients, including clients that are not utilizing 802.11ax. However, the benefits of Air Slice will be particularly useful for 802.11ax clients because 802.11ax provides mechanisms for more efficient traffic scheduling in both uplink and downlink directions. The AP is to manage the uplink resource allocation and schedule the uplink access for increased capacity and efficiency by minimizing the resource contention across multiple users. Further, TWT allows the AP and clients to negotiate specific times to access the medium. This reduces the contention and overlap between the users, which can increase device sleep time and reduce the AP power consumption.

As used herein, an access point (AP) (also referred to as a wireless access point (WAP)) refers to a Wi-Fi networking hardware device that allows Wi-Fi devices to connect to a wired network, including connection to the Internet or an intranet. The AP may connect to a router (via a wired network) as a standalone device, or may be an integral component of the router itself. As used herein, Wi-Fi refers to operation under one or more IEEE 802.11 protocols.

As used herein, station (STA) refers to a device including the capability to utilize IEEE 802.11 protocols, and may include, but is not limited to, a laptop, a desktop PC, tablet, or Wi-Fi enabled cell phone.

FIG. 1A is an illustration of a system 100 in which the intelligent scheduling of applications, including enhanced dynamic prioritization, for Wi-Fi services can be implemented. As illustrated in FIG. 1A, the system 100 may include an AP 110 to provide a connection to a network 120, wherein the AP 110 includes support for 802.11ax (Wi-Fi 6) providing both OFDMA and MU-MIMO modes of operation. In some embodiments, the AP 110 further provides for support of SU-MIMO for applications if needed. According to the embodiments, the AP 110 can provide intelligent scheduling of applications in order to provide full support of QoS requirements of each application. The network 120 can be a communications network that is operating using wireless networking technology. For example, network 120 can be a wireless LAN in accordance with the Wi-Fi 6 standard.

In an example, the AP 110 provides support for multiple different applications for multiple stations, with each application having differing characteristics and priorities. FIG. 1A serves to illustrate that these priorities can be considered as an aspect of the Air Slice Prioritization Policy. A key feature of Aruba Air Slice is to introduce a deeper level granularity for WLAN transmission, based on this Air Slice Prioritization Policy. Instead of having single WLAN transmission (Tx) policy for each WMM AC, Air Slice employs dedicated high priority transmission polices for each WMM AC. Thus, packets with a higher Air Slice priority, in accordance with the Air Slice Prioritization Policy, would get better airtime treatment. For example, packets associated with a high priority application can have a higher drain rate for packet transmission. By using flow classification technology (e.g. Deep Packet Inspection (DPI) and Unified Communications and Collaboration (UCC)), Air Slice can identify certain enterprise applications as high priority flows as governed by the Air Slice Prioritization Policy. The priorities that are defined within the Air Slice Prioritization Policy may include system priorities for certain applications, such as certain enterprise applications that are used in a particular environment.

As illustrated in FIG. 1A, the types of applications being supported by the Air Slice Prioritization Policy may include, for example:

Application 130—Application may be an enterprise business connectivity application providing multiple communication, planning, and work cooperation tools. The application 130 may have a high data throughput requirement and a high priority level.

Application 132—Application may be a voice application, the voice application having a low latency requirement (the application being sensitive to jitter, which can have a significant negative effect on user experience), but having a relatively low bandwidth requirement. The application may be presumed to have a medium priority level.

Application 134—Application may be a virtual reality (VR) application, such as utilized for gaming, training, or other purposes. Because of the nature of VR operations, the application may have both a high data throughput (high bandwidth) requirement and a low latency requirement. In this example, the application may be presumed to have a high priority level.

Application 136—Application may be a video application, which may have a high data throughput requirement, depending on the user of the application. However, the application may have a low priority level.

According to the Air Slice Prioritization Policy, the enterprise applications can be prioritized, being treated differently against other applications during WLAN transmission (even when the packets are in the same AC). For example, traffic associated with Zoom™ and Skype™ applications can both fall into the "VO&VI" AC (video conferencing applications). By employing the Air Slice Prioritization Policy, Zoom™ can be assigned a high priority being identified as an enterprise business connectivity application (Application 130); and Skype™ can be assigned a low priority being identified as a video application (Application 136). As a result, the intelligent scheduling techniques can apply the Air Slice Prioritization Policy to ensure that Zoom™ would have a prioritized WLAN transmission policy over Skype in a manner that may be optimal for the networking environment.

In some embodiments, the AP 110 provides for intelligent scheduling of data packets for the applications 130-136, selecting between OFDMA and MU-MIMO based on the characteristics of each application being served, utilizing the concept of slicing of the spectral resources, with a virtual slice being provided to prioritize applications that are important to enterprises and provide guaranteed QoS for end-to-end operation. Applications are identified regarding high throughput demands, low latency requirements, or both, and the system intelligently selects between OFDMA and MU-MIMO based on the type of application being served, with multiple queues being established having parameters to match the application profiles, as well as priority of scheduling. The access point may further select SU-MIMO operation for an application if required, such as when high bandwidth is required but MU-MIMO isn't available or practical for any reason. Each packet is identified with the relevant application flow to allow placement in a proper queue for scheduling.

According to the embodiments, the AP 110 is also configured to implement the enhanced dynamic prioritization of applications, where application prioritization is based on properties of a user associated with a client device 150 and/or properties of the client device 150 itself. The client device 150 can be a station (STA), as defined above. The enhanced dynamic prioritization (based on the criticality of the user) can be considered an "enhancement" or an additional layer of granularity added to the aforementioned Air Slice Prioritization Policy (based on the criticality of the application). This prioritization is considered "dynamic," as application prioritization is incorporated into the dynamic classification, prioritization and scheduling decisions within the AP to enable to maintenance of QoS metrics for acceptable user experience.

In one embodiment, the disclosed enhanced dynamic prioritization is implemented via user roles 140. The user roles 140 can be defined such that specific users and/or devices can be assigned a prioritization policy. As a general description, user roles 140 can be a general policy container, which includes multiple rules that govern access control for a user and/or a client in the network 120. The access control rules can define accessibility, restrictions, and capabilities with respect to accessing and communication within the network 120. In the illustrated example of FIG. 1A, the user roles 140 include a critical user role 141, and a non-critical user role 142. Referring again to the office network environment example, a critical user role 141 can include access rules and policies that are assigned to employees of the company, while the non-critical user role 142 can include access rules and policies that are assigned to visitors/guests (e.g., non-employees). Each of the critical user role 141, and the non-critical user role 142 can include an application prioritization rule that effectively enables or disables the Air Slice Prioritization Policy for that corresponding user. In order words, any traffic associated with a user having the Air Slice Prioritization Policy enabled in its user role will be scheduled in accordance with the defined Air Slice prioritization (e.g., having applications that can have high priority); and any traffic associated with a user having the Air Slice Prioritization Policy disabled in its user role will not have the benefit of the Air Slice prioritization, being directly assigned a lower priority. Accordingly, in the example, the critical user role 141 has a policy that enables the Air Slice Prioritization Policy, and the non-critical user role 142 has a policy that disables the Air Slice Prioritization Policy. FIG. 1A shows enabling/disabling the Air Slice Prioritization Policy as an example of defining a prioritization rule via user roles for purposes of illustration. It should be appreciated that other schemes may be used to define how prioritization is to be implemented using roles. For example, in some cases, a list of applications (corresponding to a particular role) that are assigned a high priority can be directly defined within the prioritization rule for a particular user role.

As a deeper level of granularity, additional user roles can be used that correspond to more specific user types, or user characteristics. For example, the critical user role 141 can include additional user roles that differentiate between the various types of critical users. In this example, the types of critical users may correspond to the departments, job titles, or positions associated with the employees, such as a user role for software engineers, a user role for hardware engineers, and a user role for finance departmental employs. This allows application prioritization to be adapted even further, being optimized for specific types users. According to this embodiment, a particular application can be deemed critical for one type of user (and prioritized), while being non-critical for a different type of user (and not prioritized). For example, when the critical employee is a software engineer, an application that is deemed important for that employee's distinct tasks (e.g., software development application, software testing application, etc.) such as "github" can be listed as a prioritized application within the application priority rule for that sub-role within the critical user role 141. Conversely, when the critical employee is not a software engineer, for example a hardware engineer, these software development applications that are not frequently used outside of the realm of software engineering will not be deemed as critical. Thus, "github" may not be listed as a prioritized application within a hardware engineer sub-role within the critical user role 141.

In another embodiment, the disclosed enhanced dynamic prioritization is implemented via priority attributes 165. The priority attributes 165 can include a list of applications that are assigned a high priority in transmission over the air in network 120, thereby ensuring that the AP 110 applies the prioritization as defined. Referring again to the business enterprise network, the priority attributes 165 can include applications that are deemed critical to that business and/or environment. In this example, the priority attributes 165 can be defined as an attribute having the values ""zoom+github," which are applications that are considered critical in the environment, and thus should be assigned high priority in the scheduling scheme. Particularly, the priority attribute 165 can be added to the authentication rules that are implemented within an authenticator 160. In an embodiment, the authentication 160 can be a RADIUS server, and the priority attributes 165 can be implemented as RADIUS VSAs. According to this embodiment, a RADIUS dictionary file that is implemented in the RADIUS server (shown as authenticator 160) can be modified to include this new VSA that defines the priority attributes 165. For example, the priority attribute 165 can be implemented as a RADUIS VSA having the configuration shown below:

| ATTRIBUTE | DATA TYPE | VALUE | USAGE |
|---|---|---|---|
| Aruba-Airslice | string | 62 | Specify a list of Air Slice applications that needs to be prioritized over WLAN |

Thus, when a user connects to the AP 110 for access to the network 120, the defined priority attributes 165 can be sent from the authenticator 160 to the AP 110 as part of an authentication procedure. For example, in the case of a RADIUS server, a list of VSAs implementing the priority attributes 165 can be communicated to the AP 110 through a "Radius.accept" message. Accordingly, in response to receiving the priority attributes 165, the AP 110 is enabled to dynamically identify and prioritize applications that are high priority. Specifically, in accordance with the Air Slice technology, a transmission (Tx) scheduler can use a high priority queue for those applications identified as high priority in the priority attributes 165.

Figure 1B:
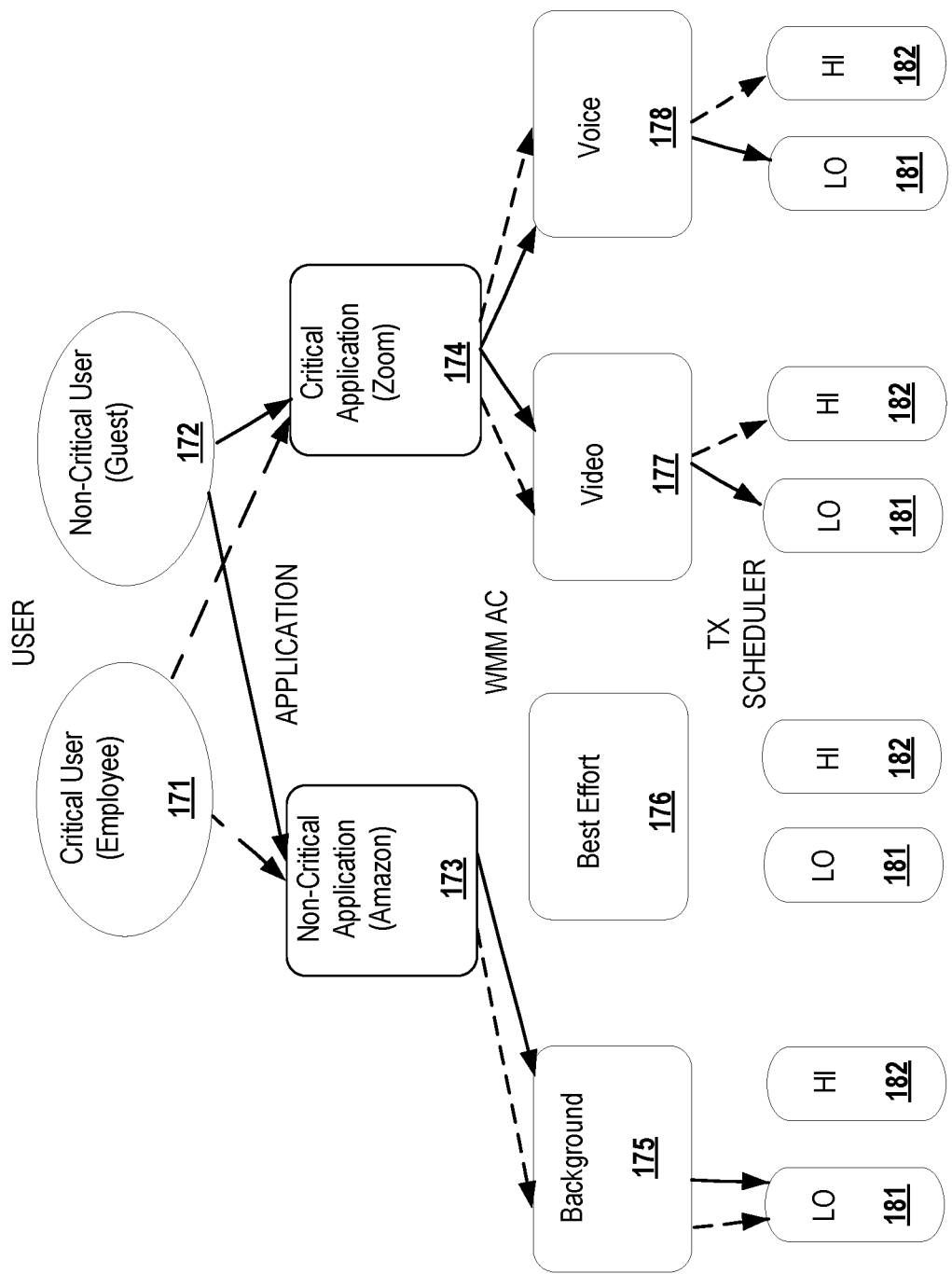
FIG. 1B is a conceptual diagram that illustrates an example of the function of the disclosed enhanced dynamic prioritization of applications including critical applications and non-critical applications, according to some embodiments.

FIG. 1B is a conceptual diagram that illustrates an example of the function of the disclosed intelligent scheduling techniques in a particular networking environment. In the example of FIG. 1B, the intelligent scheduling scheme has been configured to identify critical users 171 and non-critical users 172 that may share access and/or use of the wireless network, such as a Wi-Fi 6 LAN. The intelligent scheduling scheme can also be configured to identify one or more additional determining factors that can be used to determine a prioritization that can be dynamically assigned to an application. For example, the intelligent scheduling scheme can identify the user, and further identify a location of the user in the network (e.g., whether a student is in a classroom or a dorm room), a time of the day, a time duration for which the user has been using the prioritized access to the network, and the like. Accordingly, each of these additional determining factors may be applied by the scheme to correspond to a priority for the application (or otherwise used as one or multiple factors in determining a priority). This separation of applications can be accomplished via the dynamic prioritization techniques described in detail above. With respect to the user role implementation, this separation of users can correspond to a user role that is designated for critical users 171 and a separate user role that is designated for non-critical users 172. Referring again to the office network environment, the critical users 171 may be associated with users that are employees of the company. An employee's use of the network (and consumption of network resources) may be deemed to have priority over other traffic on the network that is related to other less essential users (who are not employees). Non-critical users 172 may be guests of the company, who are given temporary access to the network (e.g., while visiting a physical location of the company). A guest's use of the network (and consumption of network resources) may be deemed to have low priority, being given to that user as a courtesy (not essential to the operations of the company). Thus, in this example, the intelligent scheduling scheme has been tuned to particularly enable the Tx scheduler to give traffic for critical users 171 preferred treatment within the network, thereby "intelligently" adapting the scheduling scheme to be more optimal in this particular networking environment.

As seen in FIG. 1B, the intelligent scheduling scheme has been configured to identify non-critical applications 173 and critical applications 174. In this example, a non-critical applications 173 can include applications that are not considered to be directly essential to the operations of the company, but may have general wide-spread use on the network, such as Amazon. Critical applications 174 may be applications that are considered essential to the operations of the company, for instance a business connectivity application like Zoom™ Accordingly, the intelligent scheduling scheme can use the Air Slice Prioritization Policy to particularly enable the Tx scheduler to give traffic for critical applications 174 preferred treatment within the network. Even further, the separation of applications can be accomplished on a per-user level via the dynamic prioritization techniques described in detail above. With respect to the user role implementation, this separation of applications can be accomplished by: defining a rule within the user role corresponding to the critical user 171 to enable the Air Slice Prioritization Policy; and defining a rule within the user role corresponding to the non-critical user 172 to disable the Air Slice Prioritization Policy. By disabling the Air Slice Prioritization Policy via the user role for non-critical users 172, effectively assigns all traffic from these non-critical users 172 as low priority and by-passes (or turns off) the high prioritization for certain applications that would be assigned in accordance with the Air Slice Prioritization Policy. Accordingly, the intelligent scheduling scheme has been tuned to ensure that traffic generated by applications that are prioritized within the Air Slice Prioritization Policy, will be prioritized by the Tx scheduler specifically for critical users 171. In contrast, the intelligent scheduling scheme with treat traffic from the non-critical users 174 as low priority. In other words, even traffic that is generated by prioritized applications within the Air Slice Prioritization Policy, will be assigned low priority by the Tx scheduler specifically for non-critical users 172. Again, this scheduling scheme has been "intelligently" adapted to be more optimal for critical users 171, or employees, in this particular networking environment.

As seen in FIG. 1B, traffic within the network that is associated with critical users 171 (indicated in solid lined arrow) or non-critical users 172 (indicated by dashed lined arrows) that has been generated by either non-critical applications 173 or critical applications 174, will be further mapped to a specific access category (AC) for QoS based on the WMM policy. The WMM ACs are shown (in order of ascending priority) as: background 175; best effort 176; video 177; and voice 178. In the example, traffic from non-critical applications 173 will be mapped to the background 175 WMM AC, and thus will have low priority with respect to the WMM policy and QoS. Particularly, all traffic from non-critical applications 173 that are assigned to the background 175 WMM AC is routed to the corresponding low priority queue 181 at the Tx scheduler. In FIG. 1B, the flow of traffic in the intelligent scheduling scheme can be followed from critical users 171 using non-critical applications 173 that is assigned to a background WMM AC and sent to a low priority queue 181. Similarly, the flow of traffic in the intelligent scheduling scheme can be followed from non-critical users 172 using non-critical applications 173 which is assigned to the background WMM AC and sent to a low priority queue 181.

Also seen, traffic from critical applications 174 will be mapped to an appropriate WMM AC. In the example, a streaming conferencing application such as Zoom™ will generate video packets and audio packets on the network. Accordingly, traffic from the critical application can be mapped to both the video AC 177 (video packets) and the audio AC 178 (audio packets). The Tx scheduler can then apply prioritization based on the Air Slice Policy for traffic corresponding to the critical users 171. As alluded to above, the Tx scheduler can use a high priority queue for those applications identified as high priority according to the Air Slice Policy. The traffic in the high priority queues 182, can be transmitted using corresponding high priority transmission polices to be assigned preferred airtime treatment with respect to low priority traffic. For example, packets in the high priority queues 182 can be transmitted at a higher drain rate for packet transmission in the network than the packets in the low priority queues 181.

Specifically for the traffic of critical users 171 (indicated by solid line arrows) in the video AC 177, these packets will be routed to its corresponding hi priority queue 182 by the Tx scheduler, in accordance with the Air Slice Prioritization Policy. However, the traffic of non-critical users 172 (indicated by dashed line arrows) in the video AC 177 will be routed to its corresponding low priority queue 181 by the Tx scheduler. This illustrates that the intelligent scheduling, vis-à-vis the dynamic prioritization techniques, has been tuned to override the prioritization that would have been provided by the Air Slice Prioritization Policy since this policy has been disabled for these non-critical users 172, and deemed more optimal for use only by the critical users 171. Similarly, for traffic from critical users 171 (indicated by solid lined arrows) assigned to the voice AC 178, these packets will be routed by the Tx scheduler to its corresponding high priority queue 182, in accordance with the Air Slice Prioritization Policy. In contrast, the traffic of non-critical users 172 (indicated by dashed line arrows) in the voice AC 178 will be routed to its corresponding low priority queue 181 by the Tx scheduler.

Figure 1C:
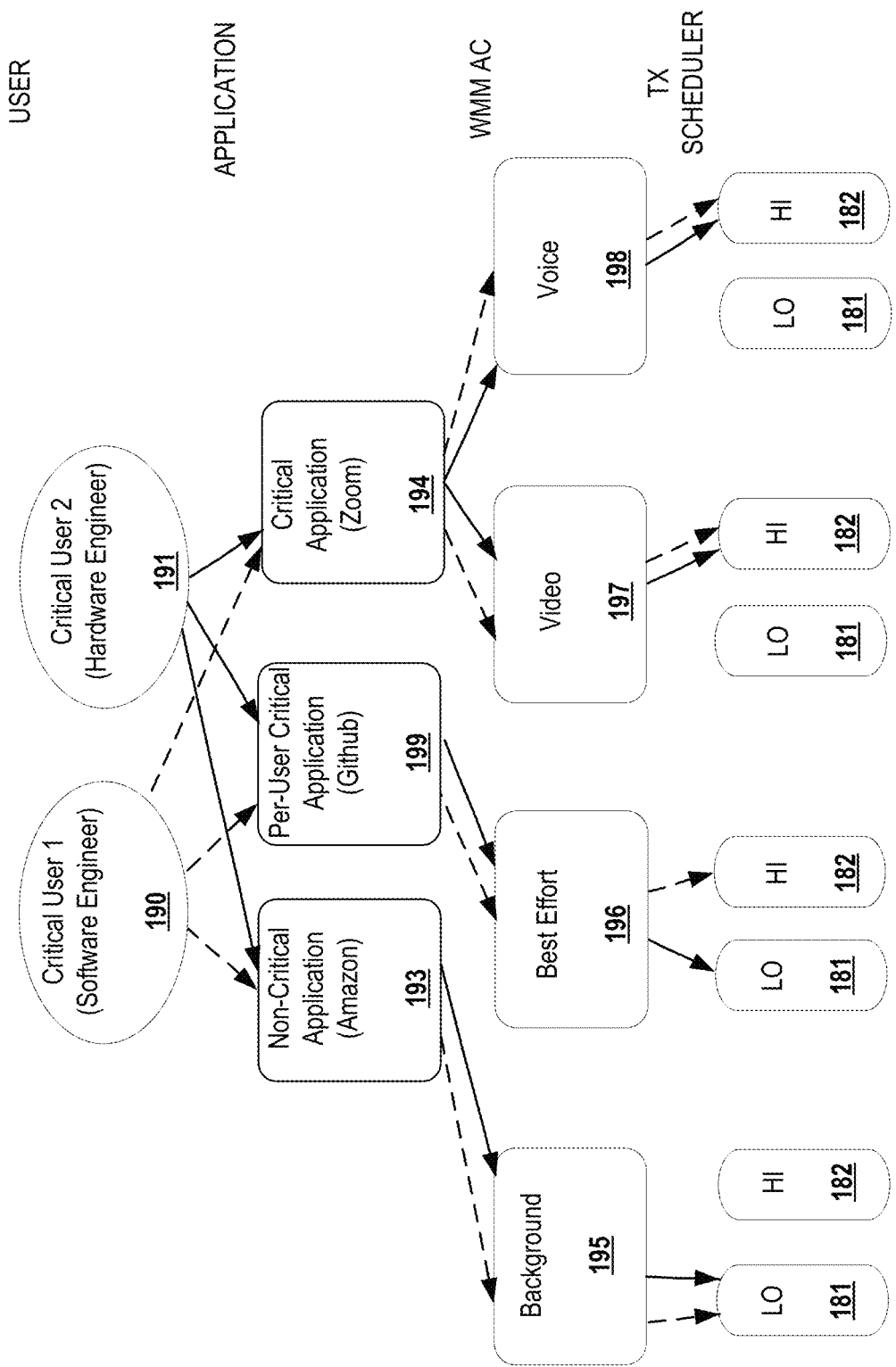
FIG. 1C is another conceptual diagram that illustrates an example of the function of the disclosed enhanced dynamic prioritization of applications including critical applications, non-critical applications, and per-user critical applications, according to some embodiments.

FIG. 1C is another conceptual diagram that illustrates a different example of the function of the disclosed intelligent scheduling techniques in a particular networking environment. In the example of FIG. 1C, the intelligent scheduling scheme has been configured to allow for a greater level of granularity with respect to identifying different types of critical users 171 that may share access and/or use of the wireless network, such as a Wi-Fi 6 LAN. Therefore, application prioritization can be assigned even more specifically to smaller sub-sets of users (down to individual users) based on additional distinguishing properties. Referring again to the office network environment, critical users may be associated with users that are employees of the company, where employees may be further grouped (or identified) based on additional properties such as job titles, departments or work groups, geographical office location (e.g., country, state, city) and the like. As alluded to above, applications that may be critical to the operations of some type of employee may not be critical for other types of employees having different operations. In this example, the intelligent scheduling scheme can identify a first sub-group of critical users that correspond to a specific sub-group or property, and identify second critical users that correspond to a different sub-group or property. For instance, the first sub-group of first critical users 190 can be software engineers, and the second sub-group of second critical users 191 can be software engineers. With respect to the user role implementation, the first critical users 190 and the second critical users 191 can respectively correspond to sub-roles that are defined under a larger user role that is associated with all critical users or all employees of the company despite their title, department, etc.

As a further enhancement, the intelligent scheduling scheme can be tuned to also consider applications that may be deemed critical only for a specific sub-set of users, and not for others user. Thus, in FIG. 1C, a per-user critical application 193 is shown. Continuing with the office network environment example, the per-user critical application 193 can be a software development application, such as GitHub™, that is only critical to the sub-group of employees that are software engineers, which correspond to the first group of critical users 190. Alternatively, the per-user critical application is not designated as a critical application to the other sub-group of employees that are hardware engineers, which correspond to the second group of critical users 191. With respect to the user role implementation, designating the per-user critical application 193 as a critical application for the first group of critical users may be implemented by listing GitHub™ as a prioritized application as a rule within the sub-role corresponding to first group of critical users 190, namely a software engineers sub-role in this example. Also, a critical application 194 is shown.

A critical application 194 can be an application that has a more general usefulness, being deemed critical across multiple types of users (or sub-groups of users), while not being so specialized that it is only utilized by a very limited sub-group of users. For example, a business connectivity application, such as Zoom™ for streaming conferencing, may be an application that important to tasks performed overall by employees (e.g., meetings), as opposed to a software development applications, like GitHub™, that typically would not be useful to hardware engineers, employees in the financial department, employees in the legal department, or most other employees outside of software engineers. With respect to the user role implementation, designating the critical application 194 may be implemented by listing Zoom™ as a prioritized application as a rule within the sub-role corresponding to first group of critical users 190, namely a software engineers sub-role; and as a rule within the sub-role corresponding to second group of critical users 191, namely a hardware engineers sub-role. Also, the critical application 194 may be listed as a prioritized application as a rule within the larger role corresponding to all critical users, or a role designated for all employees in this example.

Thus, in this example, the intelligent scheduling scheme has been tuned to particularly enable the Tx scheduler to prioritize more specialized applications, referred to as is per-user critical application, only for a selected sub-group of users. Consequently, the disclosed techniques "intelligently" adapt the scheduling scheme to be more optimal in this particular networking environment by enabling application prioritization down to a sub-user group level.

Also, it should be appreciated that FIG. 1B and FIG. 1C (as described in detail below) show low priority queues 181 and high priority queues 182 as examples, which is not intended to be limiting. For instance, an AP can be configured to utilize other queues in addition to the low priority queues and the high priority queues. As an example, a ranked list of multiple queues (being ranked from highest to lowest priority) may be implemented as an alternative or in addition to the low priority queues 181 and high priority queues 182 shown in FIG. 1B.

As seen in FIG. 1C, traffic within the network that is associated with the first sub-group of critical users 190 (indicated in solid lined arrow) or the second sub-group of critical users 191 (indicated by dashed lined arrows) can be generated by non-critical applications 193, or per-user critical applications 193, or critical applications 194. The traffic will be further mapped to a specific access category (AC) for QoS based on the WMM policy. The WMM ACs are shown (in order of ascending priority) as: background 195; best effort 196; video 197; and voice 198. In the example, traffic from non-critical applications 193 will be mapped to the background 195 WMM AC, and thus will have low priority with respect to the WMM policy and QoS. Particularly, all traffic from non-critical applications 193 that are assigned to the background 195 WMM AC is routed to the corresponding low priority queue 181 at the Tx scheduler.

Traffic from the per-user critical applications 193 will be mapped to an appropriate WMM AC. In the example, a software development application such as GitHub™ can be mapped to the best effort AC 196. The Tx scheduler can then apply prioritization based on the Air Slice Policy and based on the sub-group prioritization policy in accordance with the dynamic prioritization features. Specifically for the traffic from the first sub-group of critical users 190 (indicated by dashed lined arrows) in the best effort AC 199, these packets will be routed to its corresponding hi priority queue 182 by the Tx scheduler. The Tx scheduler dynamically prioritized this traffic from the per-user critical application 193, because the specialized application has been designated as critical, or high priority, for this specific sub-group of users. In other words, traffic from GitHub™ is prioritized in the network when this specialized application is being used by an employee within the appropriate sub-group (employee whose job deems the application critical), namely a software engineer. As shown in FIG. 1C, following the flow of traffic from the first sub-group of critical users 190 (indicated by dashed lined arrows) generated by the per-usual critical applications 199 to the best effort AC 196, the Tx scheduler is configured to direct that traffic to the corresponding high priority queue 182.

However, traffic associated with a user in the second sub-group of critical users 191 (indicated by dashed line arrows) in the best effort AC 196 will be routed to its corresponding low priority queue 181 by the Tx scheduler. In this case, traffic from GitHub™ is not prioritized in the network when this specialized application is being used by an employee outside of the appropriate sub-group (employee whose job does not deem the application critical), namely a hardware engineer. FIG. 1C shows an example of the flow of traffic from the second sub-group of critical users 191 (indicated by solid lined arrows) generated by the per-usual critical applications 199 to the best effort AC 196, the Tx scheduler is configured to direct that traffic to the corresponding low priority queue 181. Accordingly, FIG. 1C illustrates how the intelligent routing scheme can be adapted to prioritize a per-user application 199 on the sub-group level, being dynamically treated as high priority only when in use by an appropriate sub-group of users (shown as the first sub-group of critical users 190). Restated, the intelligent routing scheme can selectively optimize a specialized application in the network, for instance only prioritizing the application when its being used critically, thereby further optimizing scheduling for a particular networking environment.

For traffic from a critical application 194 that is assigned to the video AC 197 or the voice AC 178, these packets will be routed by the Tx scheduler to its corresponding high priority queue 182, in accordance with the Air Slice Prioritization Policy. In other words, because the critical application 194 has been prioritized for both the first sub-group of critical users 190, and the second sub-group of critical users 195, the critical application 194 will be treated with high priority for both groups of critical users. As shown in FIG. 1C, following the flow of traffic from the first sub-group of critical users 190 (indicated by dashed lined arrows) generated by the critical applications 194 to either the video AC 197 or the voice AC 178, that traffic is directed to the corresponding high priority queue 182. Similarly, following the flow of traffic from the second sub-group of critical users 190 (indicated by solid lined arrows) generated by the critical applications 194 to either the video AC 197 or the voice AC 178, that traffic is directed to the corresponding high priority queue 182.

Accordingly, the dynamic prioritization aspects of the intelligent scheduling techniques can optimize the scheduling scheme to a particular networking environment, by prioritizing different application in different environments as deemed necessary or appropriate. Further, the prioritizations may be modified over time, dependent on the needs of the networking environment and/or particular user.

It should be noted that the terms "optimize," "optimized," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 2:
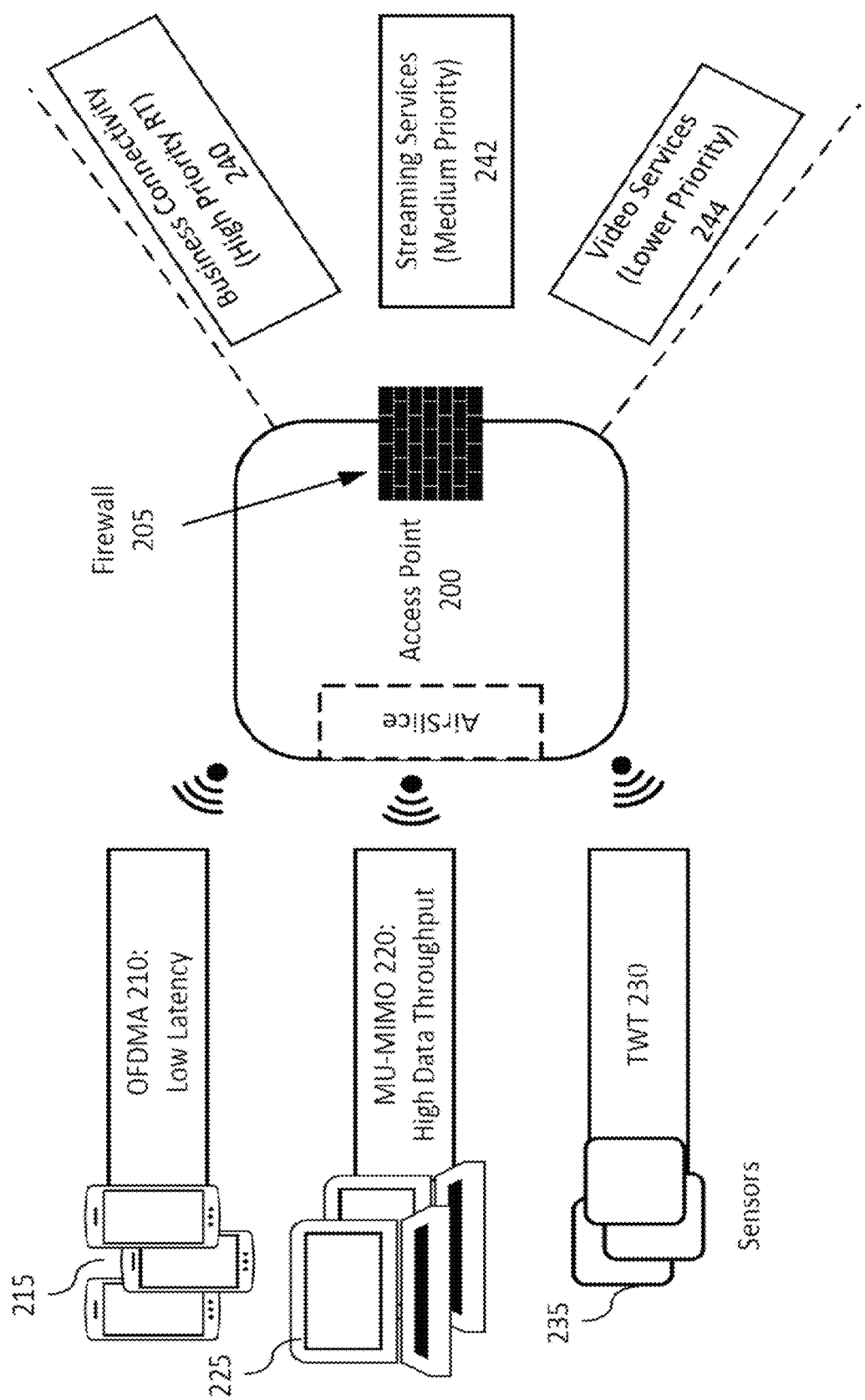
FIG. 2 is an illustration of access point operations to provide intelligent scheduling of Wi-Fi services for applications, according to some embodiments.

FIG. 2 is an illustration of access point (AP) operations to provide intelligent scheduling of Wi-Fi services for applications, according to some embodiments. In some embodiments, the AP 200 is to provide for intelligent scheduling of Wi-Fi services for multiple applications in an environment. The AP 200 includes Air Slice technology to enable effective operations for different types of applications and to ensure QoS and prioritization standards are met for each application that is being served. Furthermore, the AP 200 can apply the disclosed dynamic prioritization techniques, in order to adjust the application prioritization to be optimized for a particular networking environment. As described in detail above, the AP 200 is configured to perform dynamic airtime prioritization (using Air Slice policy) based on client and/or user properties (as defined by user roles, or RADIUS VSAs).

In an embodiment, the AP 200 may select OFDMA transmission 210 to address applications that require low latency, such as the illustrated cell phones or mobile devices 215 that may be utilized for live video chat or other similar features that cannot tolerate significant jitter. The AP 200 may select MU-MIMO transmission 220 to address applications that require high throughput, such as the illustrated laptop computers 225 that may be transferring large amounts of data for work platforms, gaming processes, or other uses. Further, the access point 200 may utilize other tools, including target wait time (TWT) 230 to enable effective sleeping operations, such as for IoT (Internet of Things) sensors 235 or other similar elements, allowing for reduction in power usage.

Further, the AP 200, including operation of a firewall 205, provides prioritization of data communication based at least in part on the particular application being addressed, including, for illustration, business connectivity applications that are high priority and require real-time (RT) performance 240; streaming services that are allocated medium priority to provide acceptable user experience 242; and video services that may be allocated lower priority 244. Other examples may be provided with various different priorities. The priorities may be affected by optional administrator preferences depending on the particular environment, system use and capabilities, and other factors.

In some embodiments, the AP 200 is to include knowledge regarding application characteristics and operation, and is to apply this knowledge in the Air Slice scheduling of application traffic.

Figure 3:
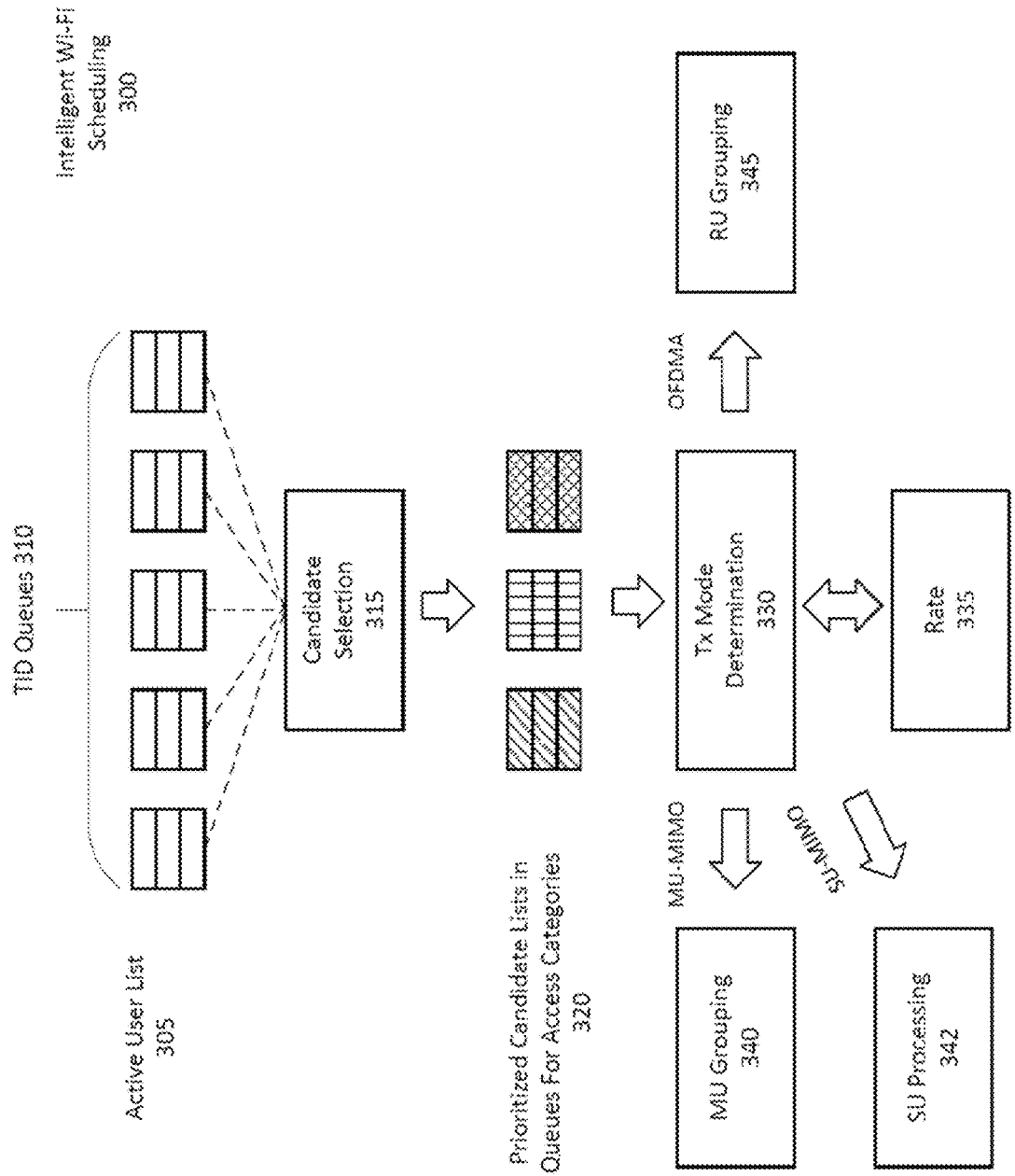
FIG. 3 is an illustration of intelligent scheduling of applications at an access point according to some embodiments.
Figure 4:
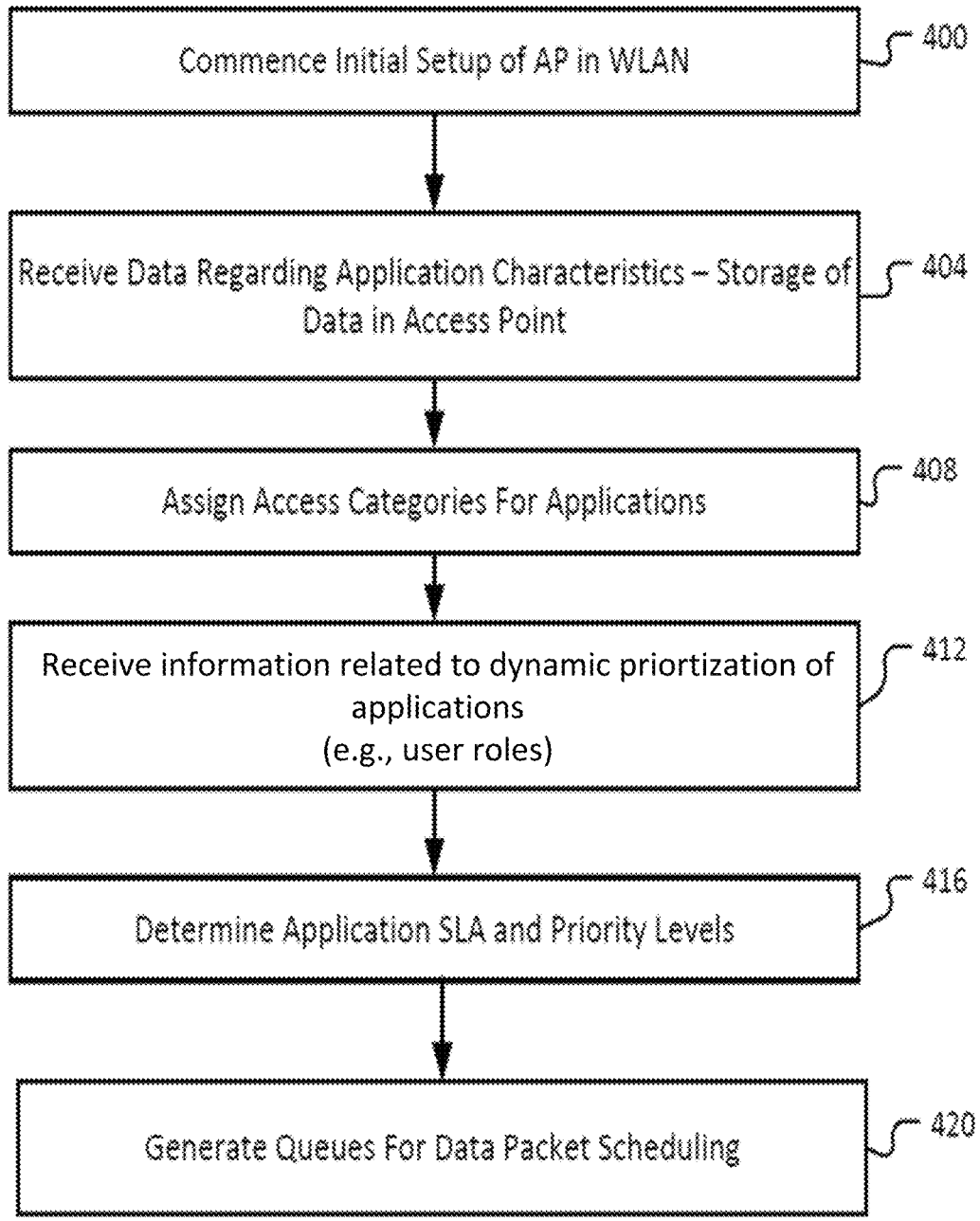
FIG. 4 is a flow chart to illustrate initial processes for intelligent scheduling of applications according to some embodiments.
Figure 5:
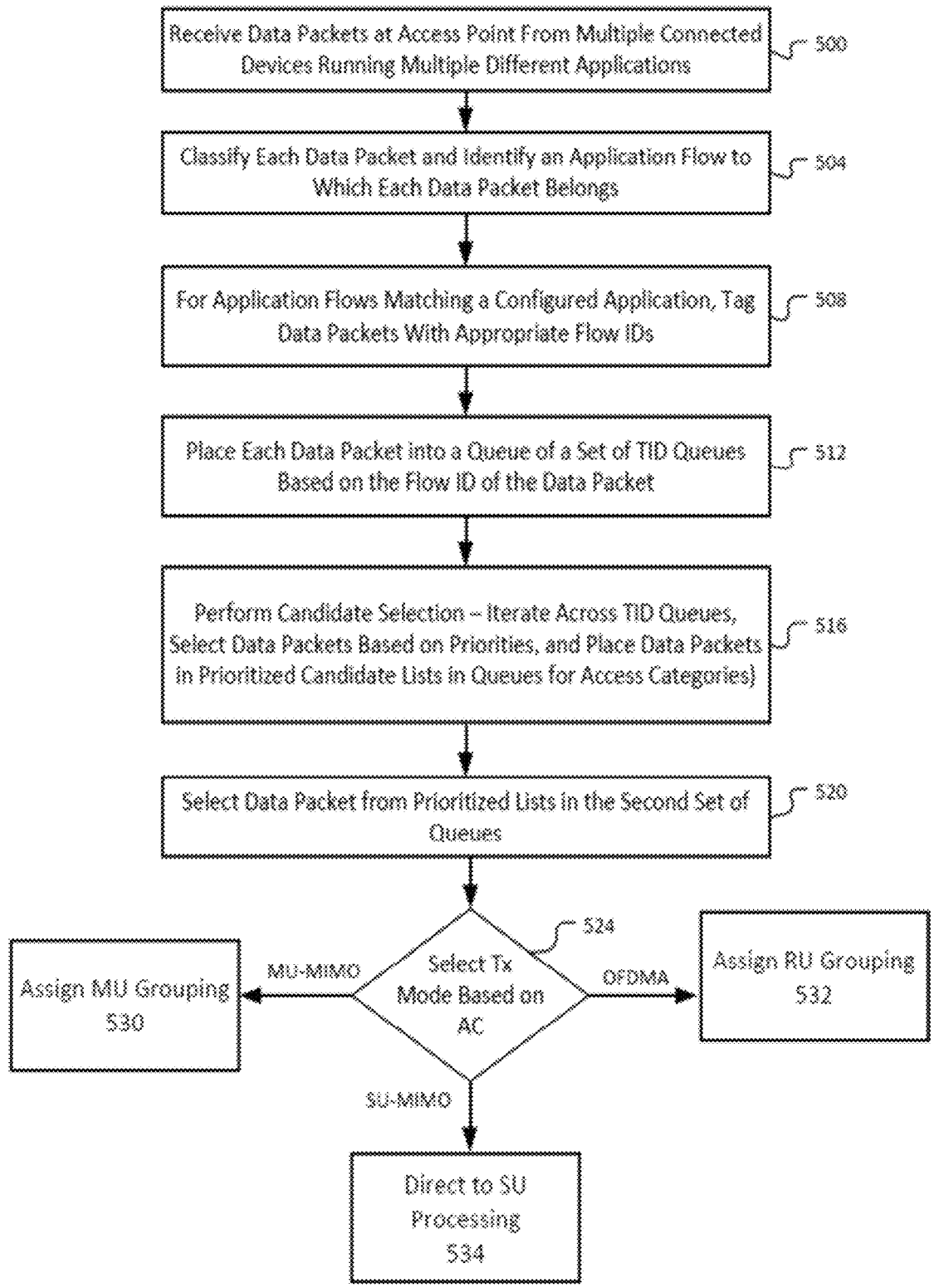
FIG. 5 is a flow chart to illustrate intelligent scheduling of applications according to some embodiments.

The operations for scheduling of data packets are further illustrated in FIGS. 3-5.

FIG. 3 is an illustration of intelligent scheduling of applications at an AP according to some embodiments. As illustrated in FIG. 3, multiple dedicated queues and 802.11ax MAC scheduling enhancements are utilized to provide intelligent scheduling of Wi-Fi services 300.

In some embodiments, intelligent scheduling of Wi-Fi services 300 includes use of a first set of queues, the first set of queues being a set of active TID (Traffic Identifier) queues 310 for an active user list 305, wherein a TID is a identifier to classify each data packet as to the type of data. In some embodiments, WLAN software of an access point will include designation of dedicated hardware and/or software queues to match the application profile of each specified applications. The parameters of such queues 310 are tuned to match the relevant application profile. Each TID queue may have different priority application traffic, with data packets to be queued based on the requirements for the application flow. In some embodiments, the deep packet inspection (DPI) is to classify each data packet and identify the application flow to which the data packet belongs. If the packet flow ID matches with that of a configured application, the DPI is to tag the data packet with the flow ID so that WLAN software can place the packet in the correct queue of the TID queues 310.

In some embodiments, during a scheduling operation, a scheduler is to iterate across all the TID queues 310 to select a candidate set of clients 315 based on priorities that are set for the data packets, wherein the priorities are established utilizing the access category that is assigned for each application. In some embodiments, certain traffic, such as specific enterprise application traffic, may be prioritized over other application and background traffic.

The scheduler is then to generate prioritized candidate lists of data packets in a second set of queues 320, wherein each queue of the second set of queues represents an access category. In some embodiments, the scheduler is then to determine an appropriate transmission mode 330 for each data packet based on the access categories of the second set of queues. The transmission mode determination 330 includes use of data rates 335.

In a first example, the scheduler may select a data packet from a first prioritized candidate list and select the MU-MIMO transmission mode for the data packet, with the data packet being sent to the appropriate MU grouping 340 for transmission. In a second example, the scheduler may select a data packet from a second prioritized candidate lists and select OFDMA transmission mode for the data packet, with the data packet being sent to the appropriate RU grouping 345. In certain circumstances the scheduler may also select single user (SU) processing 342 for data if this selection, wherein a single user is provided the multiple-input, multiple output operation, provides for best efficiency in a certain circumstance.

In some embodiments, transmit mode selection is determined for each AC based on the characteristics of the applications, and specifically based on whether an application requires low latency, whether the application requires high data throughput, or both. In some embodiments, within each AC, the transmit mode for a STA may further be limited as follows: (a) The transmit rate in MU transmit mode is not to be less than a given threshold for optimal performance, typically MCS (Modulation and Coding Scheme) 4; (b) The minimum time between the total payload of all traffic flows of this STA is larger than $T_{min}$, where $T_{min}$ is a threshold value to guarantee certain MAC efficiency using MU. For example, the setting can be $T_{min}$=300 μs (or other appropriate threshold value).

If such requirement, is not met, the transmit mode may instead be OFDMA or SU. In some embodiments, the scheduler is to further to apply delay constraints in the scheduling of data traffic. To meet the desired maximum delay of stations (STAs), the scheduler is to apply a scheduling metric to rank the STAs on the delay performance d/D, where 'd' denotes the current channel access delay of the traffic flow. For example, the delay metric may be the following: For traffic flows that are sensitive to delay/jitter (such as voice or video applications), D=20 ms (or other appropriate first value); For traffic flows that are less sensitive to delay/jitter (such as email or web applications), D=100 ms to 1 Sec (or other appropriate second value).

FIG. 4 is a flow chart to illustrate initial processes for intelligent scheduling of applications according to some embodiments. FIG. 4 and FIG. 5 in particular provide illustration of processes for Air Slice technology to allocate a virtual slice of Wi-Fi spectral resources, allocated based on policies per device, per user, or per user role, to support each of multiple connected devices, with the operation utilizing a combination of multiple dedicated queues and 802.11ax MAC scheduling enhancements.

In some embodiments, upon initial setup of an access point in a WLAN 400, the AP may receive data regarding application characteristics 404 to enable the AP to evaluate data packets. The application characteristics may include whether a particular application requires high data throughput (high bandwidth), low latency in operation (low jitter tolerance), or both. For example, a voice application will generally have low jitter tolerance, a video streaming application will generally have high bandwidth requirements, and virtual reality (VR) may require both high bandwidth and low latency guarantees. The data regarding application characteristics may be stored as required, such as in a database 625 illustrated in FIG. 6. The process then includes assigning access categories to applications for use in scheduling of data packets 408.

According to the embodiments, the AP can receive information related to the dynamic prioritization aspects disclosed here. For instance, the AP can receive information relating to user roles (and sub roles) that govern per user and per, client prioritizations that have been defined by a system operator or administrator 412. Also, the AP can receive additional prioritization rules (not included in user roles or RADIUS VSAs) that have defined by a system operator or administrator 412. As previously described, the prioritization instructions may implement dynamic prioritization features of the intelligent scheduling, selecting certain applications to receive higher or low priority based on users that have been designated as critical, applications that have been designated as critical, or a combination thereof. These selections are to be incorporated into classification, prioritization, and scheduling decisions within the AP. For example, certain enterprise applications may require prioritization in certain networking environments. The prioritization instructions may vary based on the particular environment, and may be modified over time to changes which applications are to be prioritized.

In some embodiments, the application SLA and priority levels are to be determined for use in scheduling the data packets 416. The SLA and priority levels may be determined from application characteristics and optional prioritization instructions. In a particular example, there may be four different priority levels that may be assigned for varying applications. However, any number of priority levels may be utilized in an operation.

In some embodiments, the process may include generation of queues for data packet scheduling 420. The queues may include a first set of queues for each client, such as the TID queues 310 illustrated in FIG. 3, and second set of queues for prioritized candidate lists, such as the queues 320 illustrated in FIG. 3. The queues may be dedicated in software or hardware, depending on the installation.

Upon the completions of the processes for initialization as illustrated in FIG. 4, a process may provide for intelligent scheduling of applications as illustrated in FIG. 5.

FIG. 5 is a flow chart to illustrate intelligent scheduling of applications according to some embodiments. Prior to the start of the flow, information relating to dynamic prioritization, such as defined priority attributes (e.g., RADIUS VSA) and user roles, that can be used to determine high priority applications based on the user, or whether the Air Slice policies are to be applied based user properties. For example, the AP can receive a list of applications that have high priority in the particular networking environment, from a RADIUS server as a RADIUS VSA. In some embodiments, data packets are received from multiple connected devices 500, wherein each device may be running a different application with different characteristics and priorities. In some embodiments, deep packet inspection (DPI) is used to classify each data packet and identify the application flow to which the data packet belongs 504. Further, DPI can be used identify a user associated with the application flow, a client device associated with the application flow, and any additional user properties or client properties that may be useful for dynamic prioritization.

If the application flow for any data packet matches the application flow of a particular configured application, the DPI is to tag the data packet with the appropriate flow ID 508. The WLAN software is then to place each data packet into a queue of a first set of multiple TID queues based at least in part on the flow ID of the data packet 512. The first set of queues may include the TID queues 310 as illustrated in FIG. 3.

In some embodiments, a scheduler is to perform candidate selection of the data packets 516, the process including iterating across the first set of TID queues, selecting candidate data packets from the TID queues based on priorities that have been set for the respective applications, and generating prioritized candidate lists in a second set of queues, wherein each queue of the second set of queues represents a particular access category. Further, the scheduler utilizes information related to dynamic prioritization to determine prioritization for the respective application. For example, the scheduler can determine a list of applications that are high priority based on the prioritization attributes defined in a RADIUS VSA, or determine that an application is high priority based on the identified user (in accordance with rules defined in a user role). The second set of queues may include the queues 320 containing prioritized candidate lists as illustrated in FIG. 3.

In some embodiments, the scheduler is select a data packet from the prioritized lists based on priority 520, and select an appropriate transmission mode for the data packet based on the access category for represented by each queue in the second set of queues 524. The transmission modes may include modes that are supported by the 802.11ax protocol, which include MU-MIMO, OFDMA, and SU-MIMO transmission modes.

As illustrated in FIG. 5, if the selected transmission mode for the data packet is MU-MIMO, the relevant data packet is directed to MU grouping for transmission 530; if the selected transmission mode for the data packet is OFDMA, the data packet is assigned to RU grouping for transmission 532; and if the selected transmission mode is SU-MIMO, the data packet is directed to SU processing for transmission 534.

As described above, MU-MIMO operated to increase the overall capacity in an access point by providing higher speeds per user, and is preferred for high-bandwidth applications that are less delay or jitter sensitive; OFDMA increases overall efficiency by amortizing the preamble overhead among users, and is preferred for low-bandwidth applications that are delay/jitter sensitive; and SU-MIMO may be applied when high bandwidth is required but MU-MIMO isn't available or practical for any reason.

Figure 6:
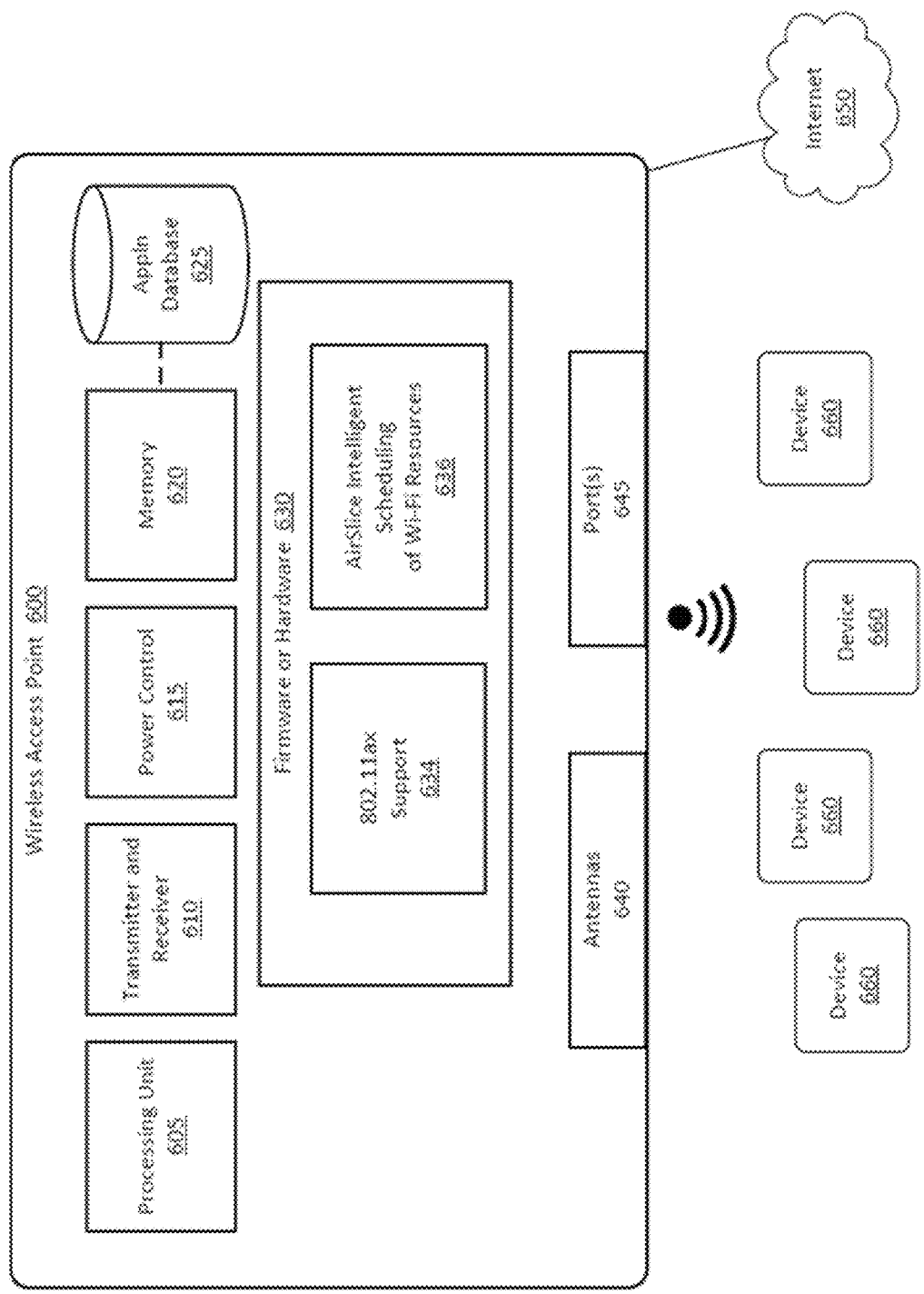
FIG. 6 illustrates an access point to provide intelligent scheduling of Wi-Fi resources for application data, according to some embodiments.

FIG. 6 illustrates an access point to provide intelligent scheduling of Wi-Fi resources for application data. according to some embodiments. An access point includes additional components and elements not illustrated in FIG. 6, which is simplified for sake of illustration. The illustrated access point 600 may include an access point including capability to operate under the IEEE 802.11ax standard, the wireless access point 600 to support both MU-MIMO and OFDMA modes, and may further provide support for SU-MIMO.

The access point 600 may include a processing unit 605, a transmitter and receiver 610, power control 615, and one or more memories 620 for the storage of data, which may include volatile memory (such as DRAM (Dynamic Random Access Memory)) and nonvolatile memories (such a ROM (Read Only Memory), flash memory, and other memory technologies). In some embodiments, the memory 620 may include storage of an application database 625 to store data regarding characteristics of multiple applications for use in selecting a transmission mode for each data packet to be handled by the access point 600 for client operations. The memory 620 may further include storage of WLAN software to perform data transmission operations.

In some embodiments, the access point 600 includes firmware or hardware 630 to support operations using multiple different transmission modes. The firmware or hardware includes IEEE 802.11ax support for tools 634, including MU-MIMO, SU-MIMO and OFDMA transmission modes. In some embodiments, the firmware or hardware 630 includes Air Slice intelligent scheduling of Wi-Fi resources 636, including dynamic prioritization techniques, and prioritized scheduling employing of MU-MIMO, SU-MIMO and OFDMA transmission modes for data packets for multiple different applications having differing characteristics in order to optimize operations for multiple applications.

The access point 600 further includes multiple antennas 640 for wireless signal communication, and one or more ports 645 for network connections or other connections, including network uplink to the Internet 650.

The access point 600 may for example include capability for providing intelligent scheduling to schedule virtual slices of Wi-Fi resource to support data for multiple different applications run on multiple connected devices 660, the scheduling utilizing a combination of multiple dedicated queues, such as TID queues 310 and the prioritized candidate lists in queues 320 for access categories illustrated in FIG. 3, to provide for optimizing selection between the transmission modes for each of the multiple applications of the multiple devices 660.

Figure 7:
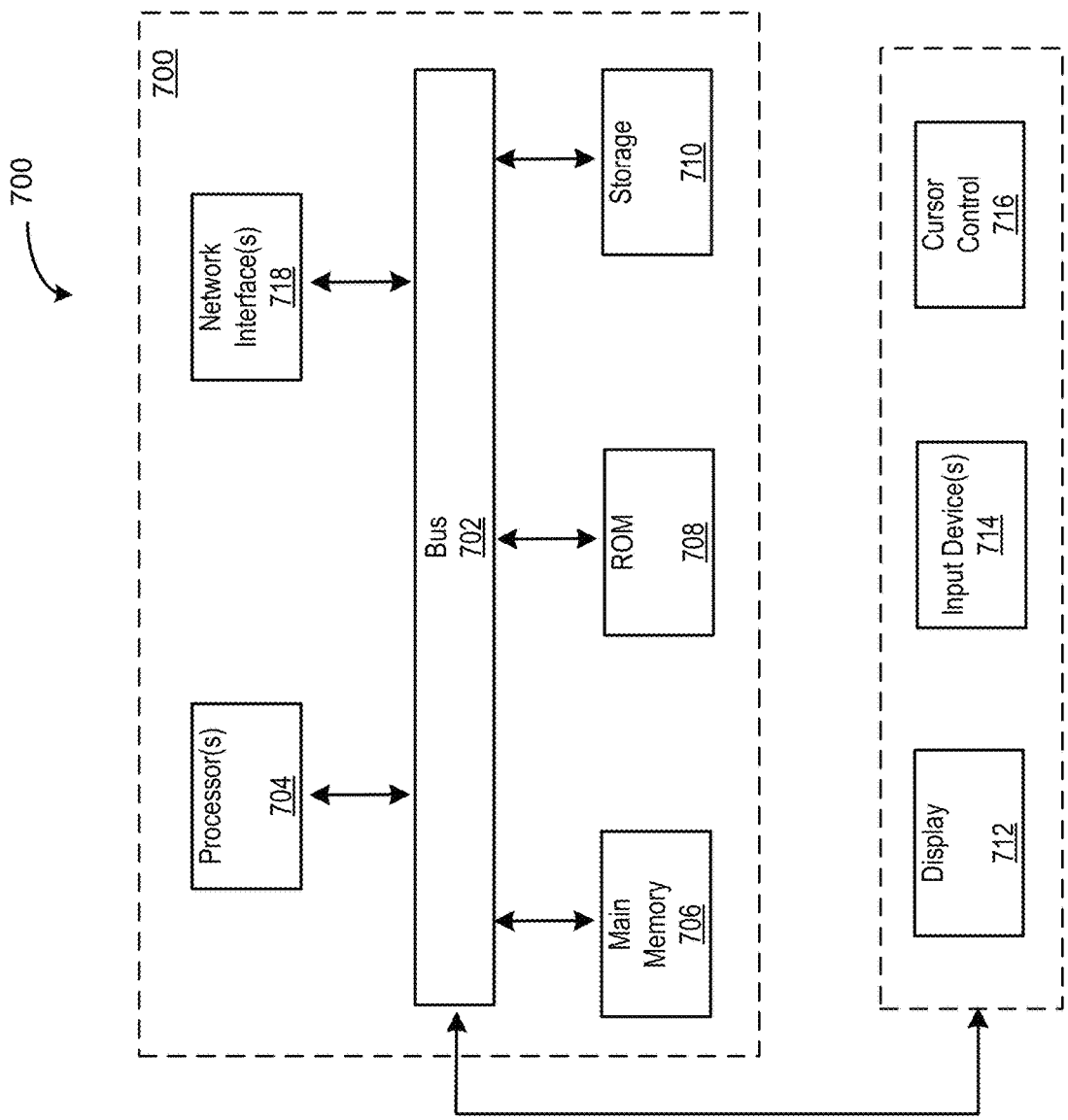
FIG. 7 illustrates an example computer system that may be used in implementing support applying the intelligent scheduling techniques in relating to the embodiments of the disclosed technology.

FIG. 7 depicts a block diagram of an example computer system 500 in which embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 512. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable storage medium having stored thereon executable computer program instructions that, when executed by one or more processors, cause the one or more processors to perform operations comprising:

receiving information related to dynamic prioritization of applications, wherein the information related to dynamic prioritization defines one or more critical applications and one or more critical users;

identifying an application flow for each data packet of a plurality of data packets received at a wireless access point, and identifying a user associated with each of the identified application flows;

assigning each data packet of the plurality of data packets to a respective queue of a first plurality of queues based at least in part on the identified application flow for each data packet;

generating prioritized candidate lists in a second plurality of queues based on iterating across the first plurality of queues to select candidate data packets for the prioritized candidate list from the first plurality of queues based at least in part on priority policies for the identified application flows, each queue of the second plurality of queues being dedicated for an access category (AC) for one or more applications;

in response to determining that a respective identified user, associated with a respective identified application flow, corresponds with the one or more critical users, selecting data packets of the respective identified application flow associated with the respective identified user for the prioritized candidate lists from the second plurality of queues responsive to the respective application flow corresponding to a critical application of the one or more critical applications;

in response to determining that the identified user associated with the application flow corresponds with the one or more critical users and that the application flow does not correspond to the one or more critical applications, overriding the selection of the data packets for the prioritized candidate lists from the second plurality of queues based at least in part on priority policies for each of a plurality of applications; and scheduling data packets from the prioritized candidate lists.

2. The non-transitory computer-readable storage medium of claim 1, further comprising:

in response to determining that the identified user associated with the application flow does not correspond with the one or more critical users, overriding the selection of the data packets for the prioritized candidate lists from the second plurality of queues based at least in part on priority policies.

3. The non-transitory computer-readable storage medium of claim 2, further comprising:

in response to determining that the identified user associated with the application flow does not correspond with the one or more critical users and that the application flow does not correspond to the one or more critical applications, overriding the selection of the data packets for the prioritized candidate lists from the second plurality of queues based at least in part on priority policies for each of a plurality of applications.

4. The non-transitory computer-readable storage medium of claim 2, wherein overriding comprises not selecting the data packets from the second plurality of queues for the prioritized candidate lists, and assigning the data packets to a low priority queue.

5. The non-transitory computer-readable storage medium of claim 1, wherein the information related to dynamic prioritization of applications comprises a user role associated with the identified user associated with the application flow and including a rule that defines one or more critical applications.

6. The non-transitory computer-readable storage medium of claim 5, wherein determining whether the identified user associated with the application flow corresponds with the one or more critical users comprises:

determining whether the user role associated with the identified user associated with the application flow indicates defines the identified user as a critical user.

7. The non-transitory computer-readable storage medium of claim 1, wherein the information related to dynamic prioritization of applications comprises a priority attribute from an authentication, wherein the priority attribute defines one or more critical applications.

8. The non-transitory computer-readable storage medium of claim 1, wherein identifying a user associated with the application flow further comprises identifying an additional factor: a location of the user, a time of day, a time duration associated with a prioritization such that selecting data packets for the prioritized candidate lists is based at least in part on a dynamic prioritization of applications corresponding to the identified additional factors.

9. The non-transitory computer-readable storage medium of claim 7, wherein the priority attribute comprises a vendor-specific attributes (VSA) for a Remote Authentication Dial-In User Service (RADIUS) that specifies a scheduling priority for the one or more critical applications.

10. The non-transitory computer-readable storage medium of claim 1, further including instructions for:

allocating a virtual slice of Wi-Fi resources to each connected device based on policies per device, per user, or per user role.

11. The non-transitory computer-readable storage medium of claim 1, wherein scheduling data packets from the prioritized candidate lists comprises applying the dynamic prioritization in the scheduling of the data packets.

12. A wireless access point comprising:

one or more processors;

a wireless transmitter and receiver, wherein the wireless access point supports a plurality of transmission modes including MU-MIMO (Multi-user Multiple-Input Multiple-Output) and OFDMA (Orthogonal Frequency Division Multiple Access); and a memory including information regarding characteristics of a plurality of applications;

wherein the wireless access point is to:

receive information related to dynamic prioritization of applications, wherein the information related to dynamic prioritization defines one or more critical applications and one or more critical users;

identify an application flow for each data packet of a plurality of data packets received at a wireless access point, and identifying a user associated with each of the identified application flows;

assign each data packet of the plurality of data packets to a respective queue of a first plurality of queues based at least in part on the identified application flow for each data packet;

generate prioritized candidate lists in a second plurality of queues based on iterating across the first plurality of queues to select candidate data packets for the prioritized candidate list from the first plurality of queues based at least in part on priority policies for the identified application flows, each queue of the second plurality of queues being dedicated for an access category (AC) for one or more applications;

in response to determining that a respective identified user, associated with a respective identified application flow, corresponds with the one or more critical users, select data packets of the respective identified application flow associated with the respective identified user for the prioritized candidate lists from the second plurality of queues responsive to the respective application flow corresponding to a critical application of the one or more critical;

in response to determining that the identified user associated with the application flow corresponds with the one or more critical users and that the application flow does not correspond to the one or more critical applications, override the selection of the data packets for the prioritized candidate lists from the second plurality of queues based at least in part on priority policies for each of a plurality of applications; and schedule data packets from the prioritized candidate lists.

13. The wireless access point of claim 12, further programmed to:

in response to determining that the identified user associated with the application flow does not correspond with the one or more critical users, overriding the selection of the data packets for the prioritized candidate lists from the second plurality of queues based at least in part on priority policies.

14. The wireless access point of claim 12, further programmed to:
in response to determining that the identified user associated with the application flow does not correspond with the one or more critical users and that the application flow does not correspond to the one or more critical applications, overriding the selection of the data packets for the prioritized candidate lists from the second plurality of queues based at least in part on priority policies for each of a plurality of applications.

15. The wireless access point of claim 12, wherein overriding comprises not selecting the data packets from the second plurality of queues for the prioritized candidate lists, and assigning the data packets to a low priority queue.

16. The wireless access point of claim 12, wherein the information related to dynamic prioritization of applications comprises a user role associated with the identified user associated with the application flow and including a rule that defines one or more critical applications.

17. The wireless access point of claim 12, wherein the information related to dynamic prioritization of applications comprises a priority attribute from an authentication, wherein the priority attribute defines one or more critical applications.

18. The wireless access point of claim 12, wherein the selection of a transmission mode for an access category includes:
selecting MU-MIMO based at least in part on one or more applications requiring high bandwidth in operation; and
selecting OFDMA based at least in part on one or more applications requiring low latency in operation.

19. The wireless access point of claim 12, wherein the wireless access point operates under IEEE 802.11ax protocol.

20. A method comprising:
receiving information related to dynamic prioritization of applications, wherein the information related to dynamic prioritization defines one or more critical applications and one or more critical users;
identifying an application flow for each data packet of a plurality of data packets received at a wireless access point, and identifying a user associated with each of the identified application flows;
assigning each data packet of the plurality of data packets to a respective queue of a first plurality of queues based at least in part on the identified application flow for each data packet;
generating prioritized candidate lists in a second plurality of queues based on iterating across the first plurality of queues to select candidate data packets for the prioritized candidate list from the first plurality of queues based at least in part on priority policies for the identified application flows, each queue of the second plurality of queues being dedicated for an access category (AC) for one or more applications;
in response to determining that respective identified user, associated with a respective identified application flow, corresponds with the one or more critical users, selecting data packets of the respective identified application flow associated with the respective identified user for the prioritized candidate lists from the second plurality of queues based at least in part on the respective application flow corresponding to a critical application of the one or more critical applications;
in response to determining that the identified user associated with the application flow corresponds with the one or more critical users and that the application flow does not correspond to the one or more critical applications, overriding the selection of the data packets for the prioritized candidate lists from the second plurality of queues based at least in part on priority policies for each of a plurality of applications; and
scheduling data packets from the prioritized candidate lists.

* * * * *